United States Patent
Thorsø

(10) Patent No.: US 6,834,772 B1
(45) Date of Patent: Dec. 28, 2004

(54) PACKAGING

(75) Inventor: Holger Thorsø, Vedbaek (DK)

(73) Assignee: Superfos A/S, Vedbaek (DK)

(*) Notice: Subject to any disclaimer, the term of this patent is extended or adjusted under 35 U.S.C. 154(b) by 18 days.

(21) Appl. No.: 10/049,278
(22) PCT Filed: Aug. 10, 2000
(86) PCT No.: PCT/DK00/00447
§ 371 (c)(1), (2), (4) Date: Mar. 20, 2002
(87) PCT Pub. No.: WO01/12519
PCT Pub. Date: Feb. 22, 2001

(30) Foreign Application Priority Data

Aug. 11, 1999 (DK) .......................................... 1999 01114

(51) Int. Cl.$^7$ .............................................. B65D 41/18
(52) U.S. Cl. ........................ 220/795; 220/378; 220/792; 425/556
(58) Field of Search ................................. 220/795, 792, 220/378; 425/556, 577, 438, 441, 809, DIG. 58; 264/334

(56) References Cited

U.S. PATENT DOCUMENTS

| 3,688,942 A | * | 9/1972 | Mitchell et al. | ............ 220/784 |
| 3,811,597 A | * | 5/1974 | Frankenberg et al. | ....... 220/284 |
| 4,177,930 A | * | 12/1979 | Crisci | ......................... 220/284 |
| 4,674,644 A | | 6/1987 | Jacobs | |
| 5,143,219 A | | 9/1992 | Yates | |
| 5,163,576 A | | 11/1992 | Galer | |
| 5,297,688 A | | 3/1994 | Beck et al. | |
| 5,730,309 A | | 3/1998 | Jiradejnunt et al. | |

FOREIGN PATENT DOCUMENTS

| CH | 672473 | 11/1989 |
| DE | 2935748 | 3/1981 |
| DE | 4133270 | 5/1993 |
| DE | 4124208 | 5/1995 |
| EP | 0052172 | 5/1982 |
| EP | 0595498 | 5/1994 |
| FR | 2560157 | 8/1985 |
| GB | 1408821 | 10/1975 |

* cited by examiner

Primary Examiner—Nathan J. Newhouse
(74) Attorney, Agent, or Firm—Dykema Gossett PLLC

(57) ABSTRACT

The invention relates to a package of a plastics material and consisting of a container and a lid adapted to be engaged with each other by snap engagement, there being provided complementary engagement faces which engage each other for establishing said snap engagement. An annular resilient sealing member is arranged between the engagement portion (40) and the bottom wall (19). The invention is characterized in that an axial compression of the sealing member (23) is provided during application of the lid (10), said compression being partially relieved when said engagement faces (29, 42) engage each other.

4 Claims, 4 Drawing Sheets

PACKAGING

Figure 1:
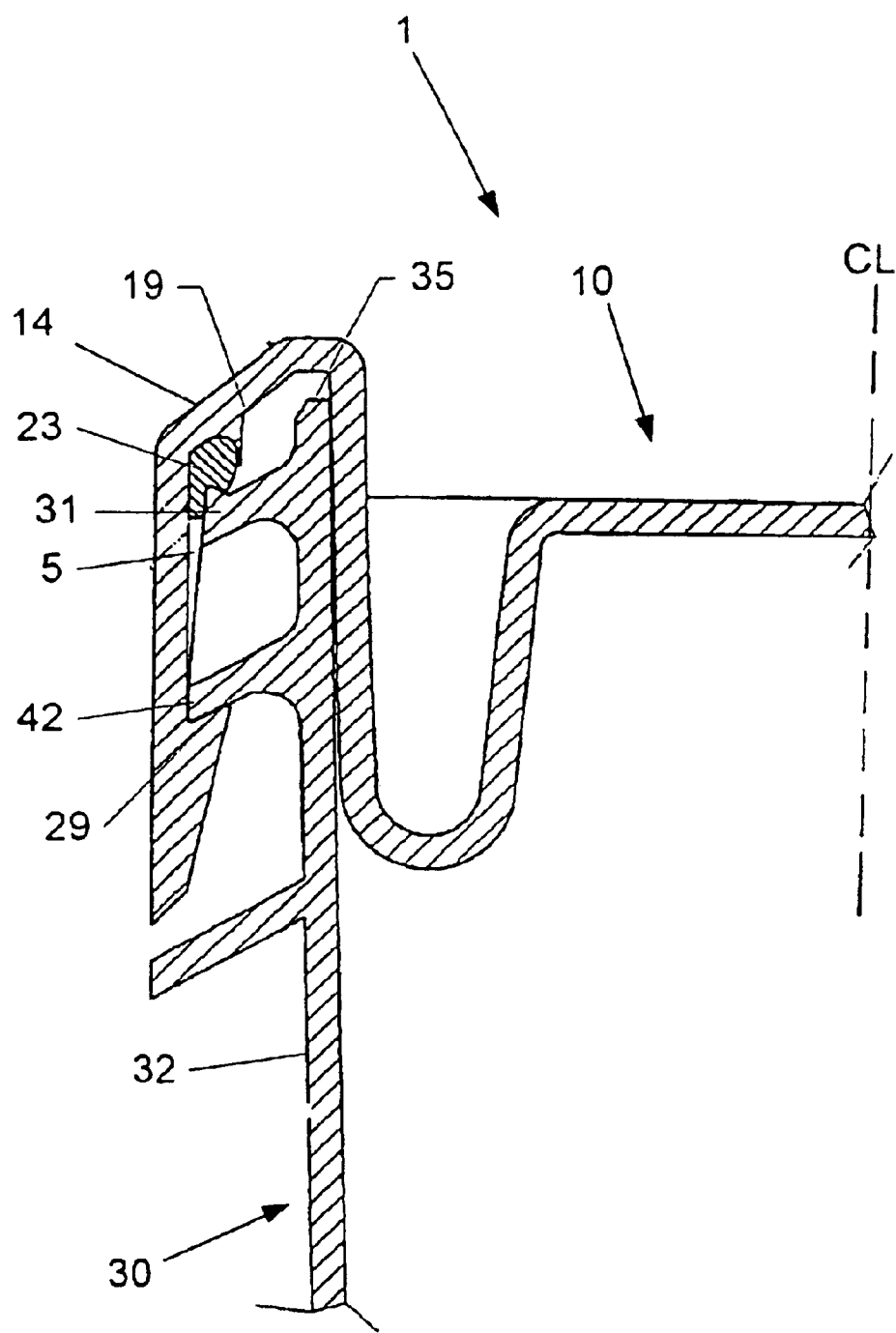

The invention relates to a plastics package of the type stated in the introductory portion of claim 1, wherein a snap engagement is provided during the application of a lid to a container. Such a package is known e.g. from U.S. Pat. No. 5,143,219.

There is a need for providing a low-cost package that is suitable for the transport of e.g. inflammable liquids. In particular, there is a need for such a package as can meet the strict demands made by the UN with respect to density, both at an internal positive pressure of 1 bar liquid pressure and 0.4 bar gas pressure as well as after a drop test where the lid of the package is affected by a concentrated external impact. Even though for years numerous attempts have been made at providing such packages of plastics (see e.g. U.S. Pat. No. 5,163,576), so far it has nevertheless been necessary to resort to metallic packages in practice to ensure reliable properties. It has thus been observed that the radial expansion of the known plastics containers combined with the tendency of the plastics layer to bulge upwards during relatively low internal pressures has given rise to release of the snap engagement, so that the mentioned UN specifications cannot be met.

The invention has made it possible to provide a low-cost package which can be made of a plastics material in a simple manner, and which meets the mentioned specifications.

This is achieved as stated in claim 1, wherein, during the establishment of a snap engagement between the lid and the container of the package, first a compression and then a partial relief of a sealing member embedded between the lid and the container are provided. This greatly obviates the situation that an internal pressure in the container and an external impact can cause the snap engagement to be released. When preferably the lid and the container are formed with inclined cooperating engagement faces, a particularly simple structure is achieved.

As stated in claim 5, the sealing member is preferably arranged in the lid, whereby damage to the sealing member during the application of the lid to the container is avoided to the greatest extent possible.

When the package is formed so as to provide a ring-shaped space, as stated in claim 6, a particularly effective sealing of the package is achieved.

The invention moreover relates to a lid for a container for providing a package of the type stated initially. The invention also relates to an expedient mould for the manufacture of the lid.

Figure 2:
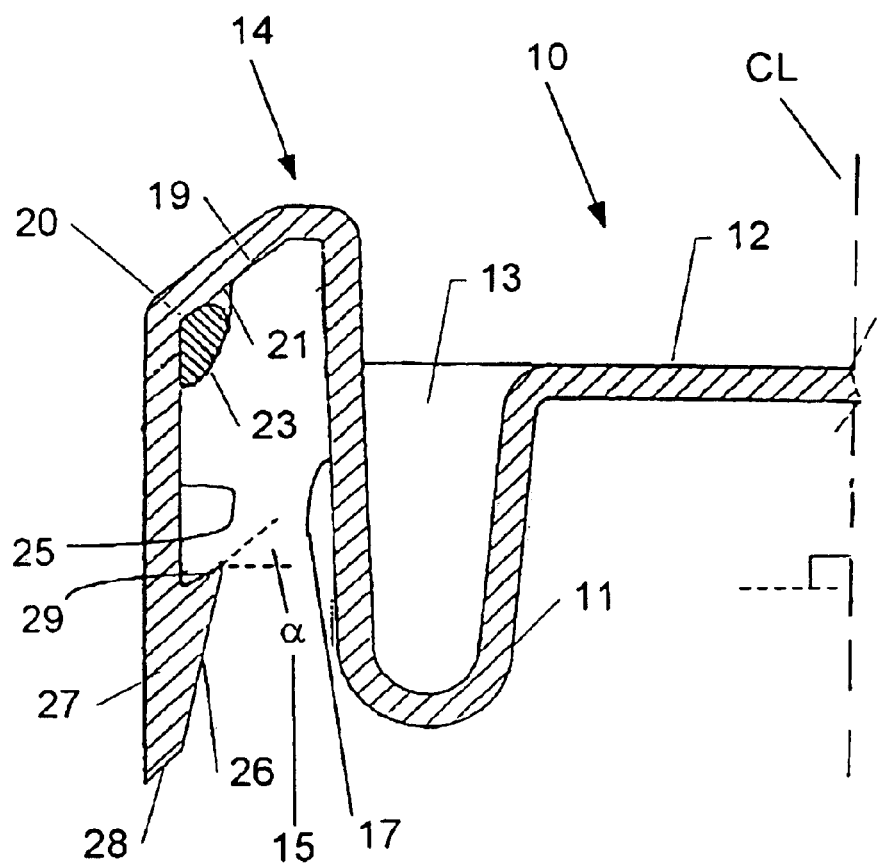
Figure 3:
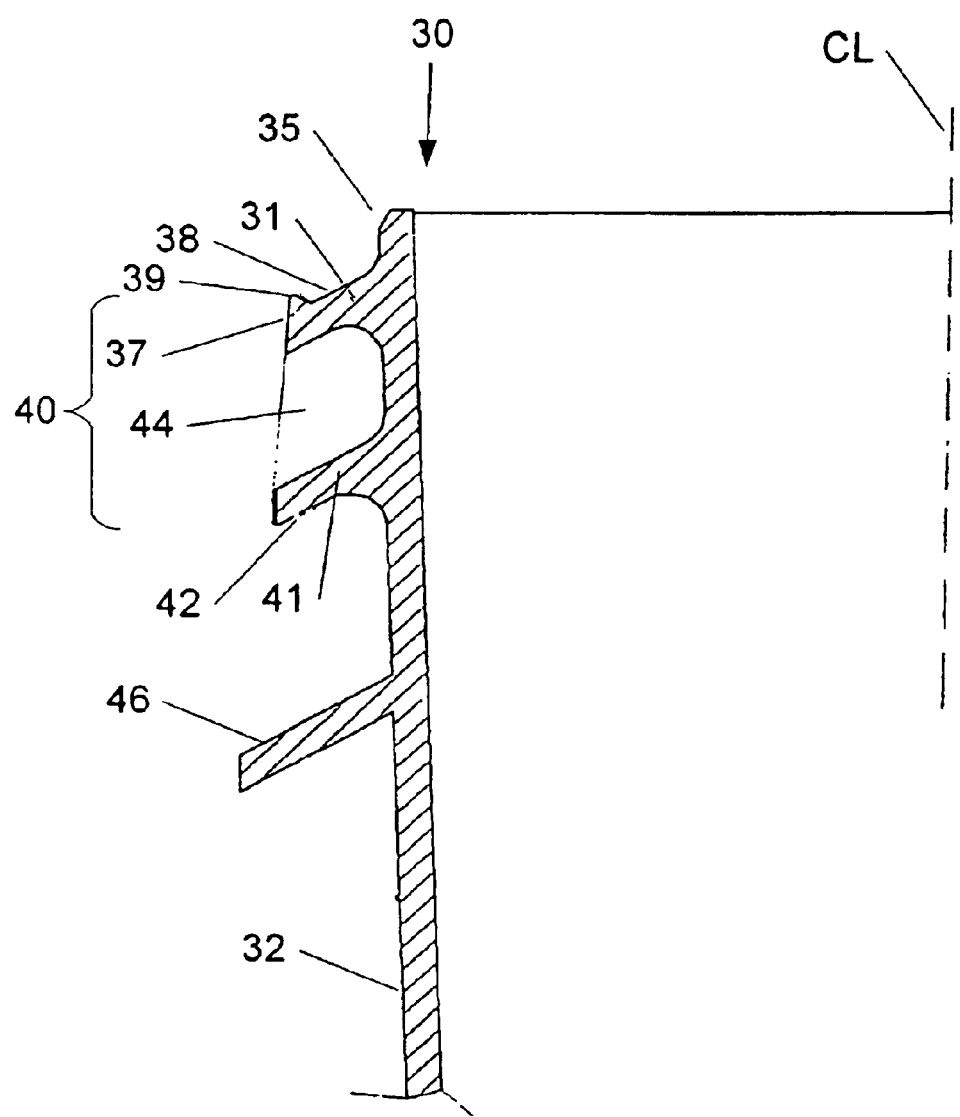

The invention will now be explained more fully with reference to the embodiment shown in the drawing. In the drawing:

FIG. 1 shows a portion of a package according to the invention, seen in cross-section, FIG. 2 shows the lid shown in FIG. 1 for the package, FIG. 3 shows the container shown in FIG. 1 for the package, and FIGS. 4a–4d show the manufacture of the lid shown in FIG. 2 using a mould according to the invention.

In FIG. 1, the reference numeral 1 generally designates a package consisting of a container 30 with an applied lid 10. The container 30 and the lid 10 extend symmetrically around an axis of symmetry CL. Both the container 30 and the lid 10 are made of a plastics material by moulding.

As mentioned initially, there is a need for providing a low-cost package which is suitable for the transport of inflammable liquids among other things. In particular, there is a need for such a package as can meet the strict requirements made by the UN with respect to density, both at an internal positive pressure of 1 bar liquid pressure and 0.4 bar gas pressure as well as after a drop test. Even though for years numerous attempts have been made at providing such packages of plastics, so far it has nevertheless been necessary to resort to metallic packages in practice to ensure reliable properties.

The shown container 30 is formed by a cylindrical wall 32 which, at its lowermost end, is connected with a bottom (not shown) for the container. Opposite the bottom, the wall 32 has an annular free edge 35. Outermost, the lid 10 has a skirt 14 which forms a downwardly open reception channel. When the lid 10 is applied to the container 30, the free edge 35 is moved into the reception channel until a position in which a snap engagement is established between the lid 10 and the container 30 by snap action. The snap engagement causes an engagement face 29 on the lid 10 to engage a complementary engagement face 42 on the container 30, which provides an effective fixing of the lid 10 on the container 30. To allow subsequent emptying of the package 1, the lid 10 may be formed with a separate opening.

As shown in FIG. 1, the package 1 also comprises an annular elastic sealing member 23. When the snap engagement has been established between the lid 10 and the container 30, the sealing member 23 engages the bottom wall 19 of the reception channel of the lid 10 with a certain bias and engages an outwardly extending annular rib 31 on the outer side of the wall 32. A ring-shaped space 5 is provided outermost between the rib 31 and the skirt 14, said space having a radial extent which decreases in a direction away from the sealing member 23, as shown.

FIG. 2 shows the lid 10 alone. It will be seen that the lid 10 comprises a face portion 12 connected with said skirt 14. As mentioned, the skirt 14 forms the reception channel, which is indicated by the reference numeral 15, of the lid, said skirt 14 comprising a first side wall 17, a second side wall 25 and the bottom wall 19. The first side wall 17 is connected with the face portion 12 via an annular wall 11, and this connection is stiffened by means of ribs 13 which are directed radially from the axis CL and are arranged at a mutual distance around the axis CL. The second side wall 25 has a free end with an end face 28 extending obliquely in a direction up toward the face portion 12.

The lid 10 moreover has engagement means 27 arranged on the second side wall 25 in the vicinity of the end face 28. As shown, the engagement means 27 consist of a plane annular engagement face 29 which extends obliquely relative to the axis of symmetry CL at an angle α. The angle α is preferably between about 15° and about 40°, preferably about 30° relative to a normal to the axis CL. An inclined face 26 connects the engagement face 29 with the end face 28.

It will moreover be seen that an annular projection 21 is arranged on the bottom wall 19. A groove-shaped depression is defined between the projection 21 and the second side wall 25, as shown, said depression forming a face 20 in which the sealing member 23 is embedded. The sealing member 23 is preferably made of synthetic rubber.

FIG. 3 shows a portion of the container 30 according to the invention. Outermost on the wall 32, at a short distance below the free end 35, there is arranged an engagement portion which is generally designated by the reference numeral 40, and which is formed to establish a tight and reliable snap engagement with the lid 10. The engagement portion 40 comprises the above-mentioned rib 31 and an underlying annular rib 41. The two ribs 31, 41 are interconnected by radially directed ribs 44 arranged at a mutual distance around the axis CL. The upper rib 31 has an outer plane end edge 37 which preferably extends at an angle of about 5° relative to the axis CL, and an upper projection 39 arranged on the face 38 which defines the upper side of the rib 31. This angle may e.g. be selected to be between about 3° and about 15°. The function of the projection 39 will be explained more fully below.

As will be seen, the rib 41 is formed on the underside with a plane annular engagement face 42 which extends obliquely relative to the axis of symmetry CL at an angle $\alpha$, i.e. in parallel with the engagement face 29 on the lid 10. The engagement face 29 preferably has such a shape and dimension that it can engage the engagement face 42 over its entire area once the snap engagement has been established.

It will be appreciated that by application of the lid 10 to the container 30 the second side wall 25 will be deformed elastically radially outwards, while the inclined face 26 is moved along the ribs 31, 41 and 44. During this, compression of the sealing member 23 is provided. When the second side wall 25 then bends back to the starting portion, at the moment when the inclined face 26 moves past the rib 41 on the container 30, said snap engagement is established, while relief of the sealing member takes place simultaneously because of the shape of the engagement faces 29, 42, when the lid subsequently moves slightly upwards during the short movement of the engagement face 29 on the engagement face 42. In this position, the sealing member 23 engages both the face 20 on the lid 10 and the face 38 on the rib 31, as shown in FIG. 1, and the projection 39 will moreover provide a localized annular deformation of the sealing member 23. This deformation causes part of the sealing member 23 to be pressed into the ring space 5 between the end edge 37 of the rib 31. Since the ring space 5 is wedge-shaped, preferably because of the oblique extent of the end edge 37 relative to the vertical axis CL, additional compression of the part of the material of the sealing member 23 that is pressed into the ring space 5 is achieved, which results in an increase in the sealing properties of the package.

It will be appreciated that the cooperating annular engagement faces 29, 42 are preferably plane; however, nothing prevents the engagement faces from bulging up-wards.

Figure 4A:
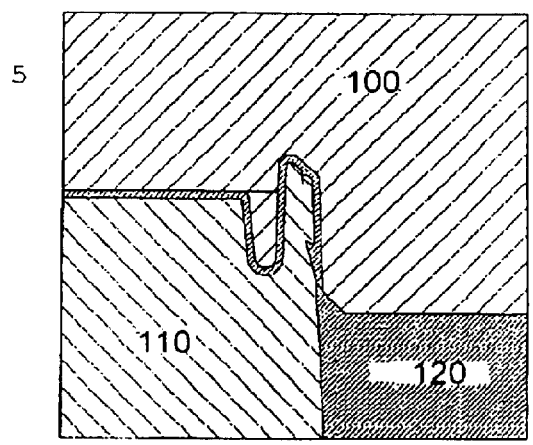

FIG. 4a shows a portion of a mould for use in the manufacture of the lid for the package described above. The mould comprises a female mould part 100, a male mould part 110 and an ejector ring 120 that surrounds the male mould part 110. These mould parts together define a mould cavity for the lid 10 into which a plastics moulding material is injected by means of devices not shown. The ejector ring 120 has a surface portion 122 which forms a moulding face for the inclined end face 28 of the lid during moulding. The male mould part 110 moreover has a recess 112 for providing the engagement face 29 of the lid 10.

Figure 4B:
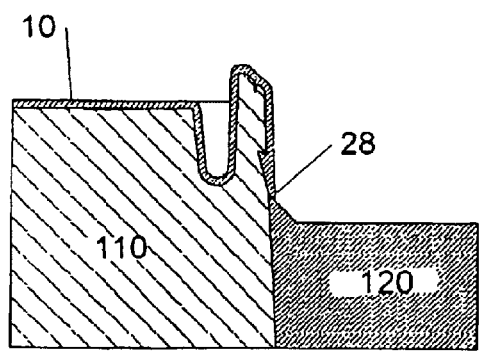
Figure 4C:
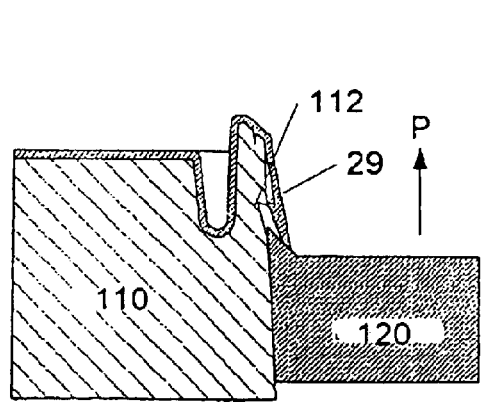
Figure 4D:
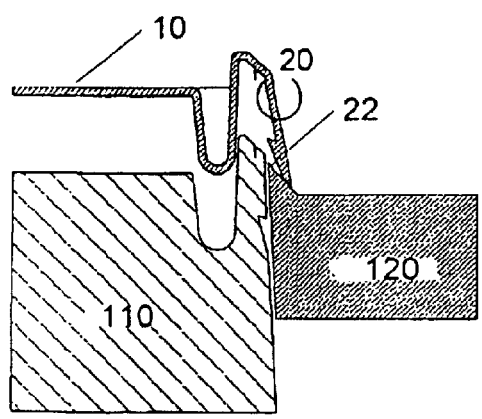

FIGS. 4b–4d show how the moulded lid is pressed out of the male mould part 110. The female mould part 100 is first removed as shown in FIG. 4b, following which the ejector ring 120 is moved vertically upwards in the direction of the arrow P as shown in FIG. 4c, so that the surface portion 122 moves along the inclined end face 28. This upwardly directed movement of the ejector ring 120 gives rise to an outwardly directed force on the finished lid 10, causing the second end wall 25 of the skirt to yield outwards, so that the engagement face 29 clears the recess 112, and so that the lid may then be pressed out of the male mould part 110 by a continued upward movement of the ejector ring 120.

EXAMPLE

A package of the type described above with reference to the drawing was manufactured. The container had a diameter of 30 cm and a height from the bottom to the free edge 35 of 40 cm. The wall thickness of the container was 0.2 cm and the thickness of the lid was 0.2 cm. The package was made of HDPE, and a sealing member made of DUROTAK H2036E manufactured by National Starch & Chemical AB, of Sweden, was selected. The ribs 31 and 41 had a thickness of 0.1 and 0.2 cm, respectively, and the angle $\alpha$ of the face 29 and 42 was selected to be 22°.

By application of an inner positive air pressure of 0.4 bar and an internal liquid pressure of 1 bar a sufficient density was observed to meet UN standard No. 1H2/Y/100/-. The package was likewise able to withstand the drop test described in the same standard.

What is claimed is:

1. A package of a plastics material and consisting of a container and a lid, said container having a bottom connected with a cylindrical wall extending around an axis (CL), said wall, opposite the bottom, having a free end which defines an opening that gives access to the interior of the container, said wall having an annular engagement portion on the outer side at its free end, said lid comprising a substantially disc-shaped face portion with a peripheral skirt which forms an annular reception channel, extending around said axis (CL), for said free end, said reception channel being defined by a first side wall, a second side wall and a bottom wall, said first side wall being connected with the disc-shaped face portion, said second side wall comprising engagement means adapted to form a snap engagement with the engagement portion, said engagement portion and said engagement means comprising complementary engagement faces adapted to engage each other for establishing said snap engagement, said engagement faces being mutually parallel and planar and extending obliquely at an angle $\alpha$ of between about 15° and about 40° relative to a normal to the axis CL, there being arranged between the engagement portion and the bottom wall an annular resilient sealing member which extends around the entire reception channel, and which, once said snap engagement has been established, engages an annular first face arranged in the reception channel and a second annular face arranged on the container at said free end, wherein said first face or second face exhibits an annular projection adapted to generate a further, local compression of the sealing member when the engagement faces engage each other, wherein said first face arranged in the reception channel defines an annular groove, and said sealing member is secured in the groove by adhesion or in another manner, and said second face exhibits the annular projection adapted to generate said additional, local compression of the sealing member, wherein the engagement portion and the engagement means are shaped such that an axial compression of the sealing member is provided during the application of the lid, said compression being partially relieved when said engagement faces engage each other, wherein radially outwards from the axis (CL) and in extension of said annular projection, the engagement portion exhibits an end edge arranged opposite the second side wall of the reception channel, and wherein the end edge and said second side wall between them define a ring-shaped space whose radial extent decreases in a direction away from the sealing member.

2. A package according to claim 1, wherein the sealing member is secured to said first face by adhesion.

3. A package of plastics material and consisting of a container and a lid, said container having a bottom connected with a cylindrical wall extending around an axis (CL), said wall, opposite the bottom, having a free end which defines an opening that gives access to the interior of the container, said wall having an annular engagement portion on the outer side at its free end, said lid comprising a substantially disc-shaped face portion with a peripheral skirt which forms an annular reception channel extending around said axis (CL), for said free end, said reception channel being defined by a first side wall, a second side wall and a bottom wall, said first side wall being connected with the disc-shaped face portion, said second side wall comprising engagement means adapted to form a snap engagement with the engagement portion, said engagement portion and said engagement means comprising complementary engagement faces adapted to engage each other for establishing said snap engagement, there being arranged between the engagement portion and the bottom wall an annular resilient sealing member which extends around the entire reception channel, and which, once said snap engagement has been established, engages an annular first face arranged in the reception channel and a second annular face arranged on the container at said free end, wherein the engagement portion and the engagement means are shaped such that an axial compression of the sealing member is provided during the application of the lid, said compression being partially relieved when said engagement faces engage each other, wherein radially outwards from the axis (CL) and in extension of said annular projection, the engagement portion exhibits an end edge arranged opposite the second side wall of the reception channel, and wherein the end edge and said second side wall between them define a ring-shaped space whose radial extend decreases in a direction away from the sealing member.

4. A mould for the manufacture of a lid comprising a substantially disc-shaped face portion with a peripheral skirt which forms an annular reception channel extending around said axis (CL) for the free end of a container, said reception channel being defined by a first side wall, a second side wall and a bottom wall, said first side wall being connected with the disc-shaped face portion, said second side wall comprising engagement means adapted to form a snap engagement with an engagement portion on said container, said engagement means comprising an engagement face which extends obliquely relative to said axis (CL) at an angle α of between about 20° and about 40° relative to a normal to the axis CL, an annular sealing means being secured in the reception channel by adhesion, said free end of said second side wall comprising an inclined end face which extends approximately in parallel with said engagement face on the lid, said lid being manufactured using a female mould part, a male mould part and an ejector ring, which together define a mould cavity for the lid, said ejector ring being adapted to be moved in a direction of said axis (CL) to release a lid just moulded from the male mould part, characterized in that the ejector ring defines a moulding face for said inclined end face on the lid.

* * * * *